(12) United States Patent
Haber et al.

(10) Patent No.: US 10,984,432 B2
(45) Date of Patent: Apr. 20, 2021

(54) USING MEDIA INFORMATION FOR IMPROVING DIRECT MARKETING RESPONSE RATE

(71) Applicant: International Business Machines Corporation, Armonk, NY (US)

(72) Inventors: Eben M. Haber, Cupertino, CA (US); Jalal U. Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/555,664

(22) Filed: Aug. 29, 2019

(65) Prior Publication Data

US 2019/0385181 A1  Dec. 19, 2019

Related U.S. Application Data

(63) Continuation of application No. 13/774,226, filed on Feb. 22, 2013, now Pat. No. 10,460,334.

(51) Int. Cl.
*G06Q 30/02* (2012.01)

(52) U.S. Cl.
CPC ............. *G06Q 30/0204* (2013.01)

(58) Field of Classification Search
CPC ................................ G06Q 30/0204
See application file for complete search history.

(56) References Cited

U.S. PATENT DOCUMENTS

| | | | |
|---|---|---|---|
| 6,278,996 B1 | 8/2001 | Richardson et al. | |
| 7,720,835 B2 | 5/2010 | Ward et al. | |
| 7,930,302 B2 | 4/2011 | Bandau et al. | |
| 2011/0179114 A1 | 7/2011 | Dilip et al. | |
| 2012/0221502 A1 | 8/2012 | Jerram et al. | |
| 2012/0232956 A1* | 9/2012 | Dilip | G06Q 30/02 705/7.33 |
| 2014/0019118 A1 | 1/2014 | Tromp | |
| 2014/0164504 A1 | 6/2014 | Dellenbach et al. | |
| 2014/0177813 A1* | 6/2014 | Leeds | H04M 3/02 379/67.1 |

(Continued)

OTHER PUBLICATIONS

Palmer, A. et al., "An Experiential, Social Network-Based Approach to Direct Marketing", Direct Marketing: An International Journal, 2009, pp. 162-176, vol. 3, No. 3, Emerald Group Publishing Limited, United Kingdom.

(Continued)

*Primary Examiner* — Andre D Boyce
(74) *Attorney, Agent, or Firm* — Sherman IP LLP; Kenneth L. Sherman; Hemavathy Perumal

(57) ABSTRACT

Embodiments of the invention relate to improving direct marketing response rate through use of media information. One embodiment includes extracting samples of language usage in one or more social media activities. Language usage features comprising relationships to products are derived by analyzing the extracted samples for relevant language terms. The language usage features are mapped to one or more of personality traits, emotional state and personal features. The mapped language usage features and personal features are stored in a repository. Customers are segmented for direct marketing using the mapped language usage features and the personal features.

18 Claims, 5 Drawing Sheets

(56) References Cited

U.S. PATENT DOCUMENTS

2014/0177821 A1   6/2014   Ristock et al.

OTHER PUBLICATIONS

Hassell, W. et al., "Using IBM Social Business to Take Your Business Relationships to the Next Level: A Game Changer for Small, Medium, and Large Businesses", IBM Redbooks Publication, REDP-4746-00, Apr. 5, 2011, pp. 1-16, IBM Corporation, USA.

Schmotzer, K. et al., "IBM LotusLive: A Social Networking and Collaboration Platform for the Midmarket", IBM Redbooks Publication, REDP-4728-00, Mar. 23, 2011, pp. 1-10, IBM Corporation, USA.

Anonymous, "Social Data Analysis as Unobtrusive Measure for Validating Human Behavior Assessment or Test (Psychometric) Results", IPCOM000208050D, Jun. 21, 2011, pp. 1-9, IP.com, USA.

Carbonell, J.G., "Computer Models of Human Personality Traits", Technical Report Paper 2403, Nov. 1979, pp. 1-30, Computer Science Department, Carnegie Mellon University, USA.

Mairesse, F. et al., "Words Mark the Nerds: Computational Models of Personality Recognition through Language", Proceedings of the 28th Annual Conference of the Cognitive Science Society (CogSci '06), Jul. 2006, pp. 543-548, Cognitive Science Society, USA.

Tausczik, Y.R. et al., "The Psychological Meaning of Words: LIWC and Computerized Text Analysis Methods", Journal of Language and Social Psychology, Dec. 8, 2009, pp. 24-54, vol. 29, No. 1, SAGE Publications, USA.

Yarkoni, T., "Personality in 100,000 Words: A Large-Scale Analysis of Personality and Word Usage Among Bloggers", Journal of Research in Personality, Jun. 2010, pp. 363-373, vol. 44, No. 3, Elsevier, Inc., The Netherlands.

Gill, A.J. et al., "What Are They Blogging About? Personality, Topic and Motivation in Blogs", Proceedings of the Third international Conference on Weblogs and Social Media (ICWSM '09), May 2009, pp. 18-25, Association for the Advancement of Artificial Intelligence, USA.

U.S. Restriction Requirement for U.S. Appl. No. 13/774,226 dated Jul. 6, 2015.

U.S. Non-Final Office Action for U.S. Appl. No. 13/774,226 dated Nov. 20, 2015.

U.S. Final Office Action for U.S. Appl. No. 13/774,226 dated Aug. 12, 2016.

U.S. Advisory Action for U.S. Appl. No. 13/774,226 dated Oct. 27, 2016.

U.S. Non-Final Office Action for U.S. Appl. No. 13/774,226 dated Jan. 12, 2017.

U.S. Final Office Action for U.S. Appl. No. 13/774,226 dated Jun. 15, 2017.

U.S. Advisory Action for U.S. Appl. No. 13/774,226 dated Aug. 24, 2017.

U.S. Non-Final Office Action for U.S. Appl. No. 13/774,226 dated Sep. 20, 2017.

U.S. Final Office Action for U.S. Appl. No. 13/774,226 dated Feb. 9, 2018.

U.S. Advisory Action for U.S. Appl. No. 13/774,226 dated Apr. 12, 2018.

U.S. Non-Final Office Action for U.S. Appl. No. 13/774,226 dated Jun. 25, 2018.

U.S. Final Office Action for U.S. Appl. No. 13/774,226 dated Feb. 7, 2019.

U.S. Notice of Allowance for U.S. Appl. No. 13/774,226 dated Jun. 19, 2019.

\* cited by examiner

USING MEDIA INFORMATION FOR IMPROVING DIRECT MARKETING RESPONSE RATE

BACKGROUND

Embodiments of the invention relate to direct marketing, and in particular, using media linguistic information for improving direct marketing response rate.

Social media are popular avenues for information sharing or exchange. Information sharing systems, such as forums for obtaining product reviews or social messaging systems are sometimes helpful to users on social media platforms. People also informally exchange information in social media and business context through platforms, such as Facebook® and Twitter®. Businesses at times may use social media platforms for announcing new products or deals on existing products. Users of the social media platforms may discuss the newly announced products or deals. Businesses interact with people through advertising, requests for information and customer service.

BRIEF SUMMARY

Embodiments of the invention relate to improving direct marketing response rate using media information. One embodiment includes extracting samples of language usage in one or more social media activities. Language usage features comprising relationships to products are derived by analyzing the extracted samples for relevant language terms. The language usage features are mapped to one or more of personality traits, emotional state or personal features. The mapped language usage features and personal features are stored in a repository. Customers are segmented for direct marketing using the mapped language usage features and the personal features.

Another embodiment comprises extracting samples of language usage in one or more social media activities. A likelihood of product interest in one or more products is determined by analyzing the extracted samples for a relationship to a product based on language terms. A response to product marketing is predicted using a prediction model that is generated based on the determined likelihood of product interest. Customers are segmented for direct marketing based on the predicted response.

One embodiment comprises extracting samples of language usage in one or more social media activities. Time and date information are extracted for the samples of language usage based on when the one or more social media activities were conducted. Temporal activity patterns are derived based on statistics for the extracted time and date information. The probability of customer response to a direct marketing activity is modeled based on derived temporal activity patterns. Segmentation of contacts for direct marketing is performed using the modeled probability and derived temporal activity patterns.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
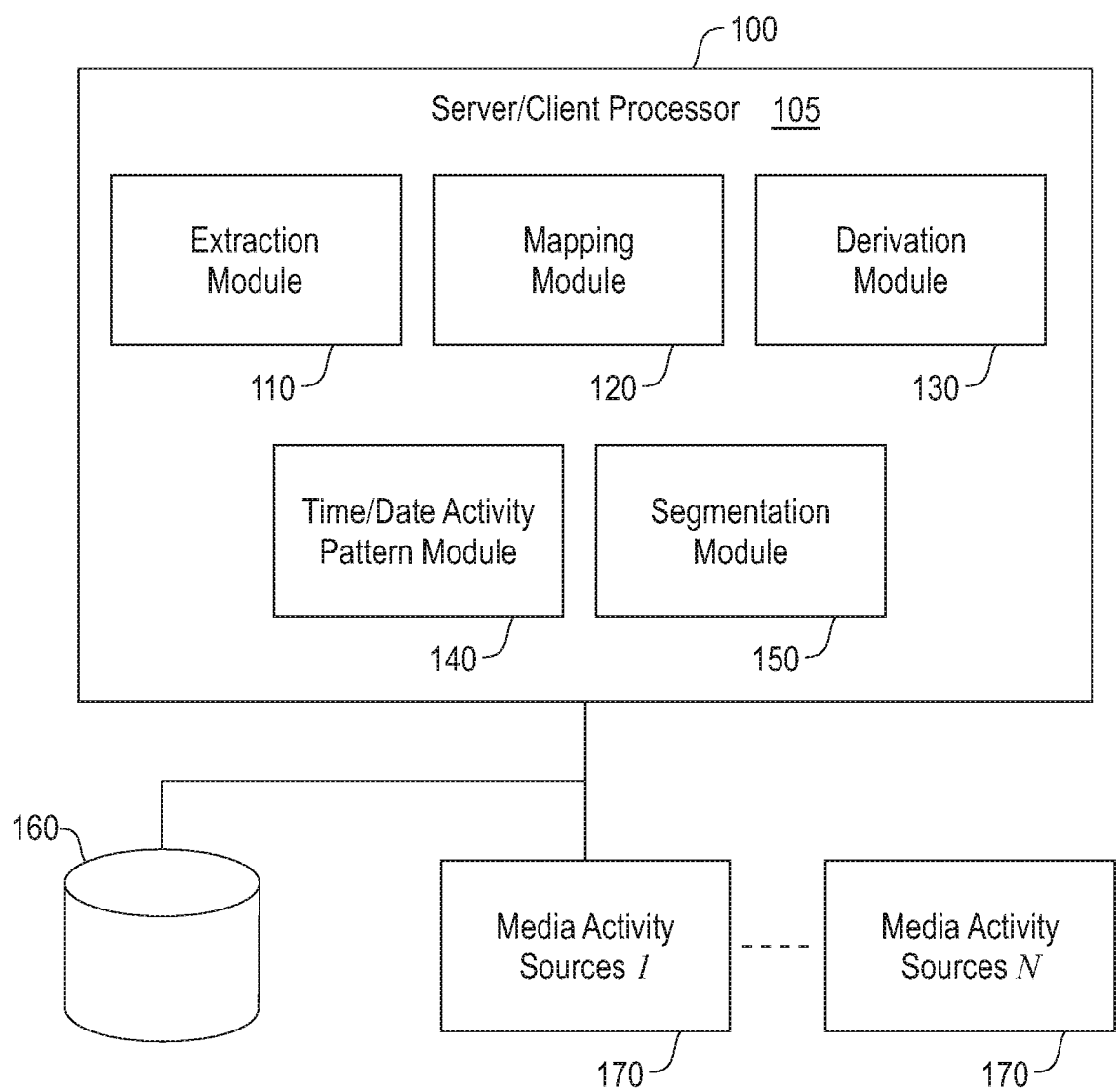
FIG. 1 illustrates a block diagram of an example system for using media information for improving direct marketing response rate, in accordance with an embodiment of the invention.

Referring now to the drawings, FIG. 1 shows an implementation of system 100 for using media (e.g., social media) information for improving direct marketing response rate. In one embodiment, system 100 comprises a server or client processor 105 including an extraction module 110, a mapping module 120, a derivation module 130, a time and/or date activity pattern module 140 and a segmentation module 150. System 100 further includes a repository 160 (e.g., storage device(s), memory device(s), virtual memory, etc.) and media activity sources 1-N 170. In one embodiment the repository may comprise a storage device or medium that is directly, indirectly or virtually connected to the system 100. In one embodiment, the media activity sources 1-N 170 may be coupled to the system 100 via a network (wireless, wired, etc.). In one example, the media activity sources 1-N 170 may comprise written and verbal sources, such as multiple social media platforms, websites, written/verbal surveys, call centers, etc. In one embodiment, the system 100 collects, organizes and analyzes language samples on a per-person basis, and generates personal language usage features for individuals.

In one embodiment, the extraction module 110 provides extraction of samples of language usage in one or more media activities from the media sources 1-N 170, such as chatting, messaging, commenting, posting, replying to questions, replying to topics, providing feedback, providing product reviews, conducting written/verbal surveys, responding to a call center questionnaire, text from personal web pages, etc. In one embodiment, the extraction module 110 searches written text or speech responses using key words, such as product names, competing product names, text/speech related to products or product fields, ownership, intent to purchase, intent to sell, etc., for extracting text samples. In another embodiment, the extraction module 110 searches for specific user written activities including comments based on topics or from following postings from one or more media activities. Speech responses may also be searched using known speech recognition techniques and speech-to-text conversion techniques. In one embodiment, the extraction module 110 extracts samples of language use at predetermined intervals (e.g., once a month, twice a month, once a week, etc.).

In one example, the specific users are previous customers, potential customers, competing product customers, or any combination of the three. The specific users' information may be collected based on customer questionnaires, profiles, requested information, etc. In one example, businesses may maintain databases of customers/potential customers profiles that may include customer information, such as contact information, name, demographics (e.g., age, location, education, income, etc.), social media websites that are visited/used, usernames of social media platforms, email addresses, etc. In one embodiment, the specific users' information is stored in the repository 160.

In one embodiment, the derivation module 130 derives language usage features from samples of language usage extracted samples (e.g., text, converted speech-to-text, etc.) with respect to various relationships to relevant products for derivation of usage features. In one example, usage features may be derived based on a pre-defined taxonomy of product names, and text may be searched for product mentions, with analysis and searching for nearby words to indicate a like, dislike, or intent to purchase these products, etc. In another example, the derived usage features may be described as numbers indicating product mentions, both in general and also in terms of relationships, such as a like, a dislike, ownership, intent to purchase, etc. In one embodiment, the derived language features may be used for prediction modeling to compute a probability of customer response to direct marketing techniques.

In one embodiment, the mapping module 120 uses the derived language usage for analysis with respect to various relationships to relevant products for mapping usage features. In one embodiment, the samples may be analyzed using content-dependent and content-independent analysis. In one example, content-dependent analysis relates to what a person is saying/writing. Content-dependent analysis searches for product/brand mentions, or text indicating something about a person's activities (e.g., from an application, messages that may indicate that users are currently busy). In one example, content-independent analysis doesn't relate to what a person is talking/writing about. For example, content-independent analysis may comprise measuring the times of media usage, for indicating availability, regardless of what a person says or writes. In one example, content-independent analysis may measure the Linguistic Inquiry and Word Count (LIWC) features, which describe language use in terms of how frequently people use 68 categories of words. These low-level LIWC language features may be mapped to higher-level personality features (e.g., Big5 (e.g., openness, conscientiousness, extraversion, agreeableness, and neuroticism), or Big5+facets). Another example may comprise word-length and sentence length, which may be used by tests such as the Flesch-Kincaid readability and grade-level measures, which use sentence and word lengths to indicate readability and the grade-level at which a person writes. Many possible low-level language features exist, based on individual word use, phrase use, sentence structure, etc. One goal of content-independent analysis is to measure language features and map them to general personal features, such as personality, emotional state, level of education, or anything else for which a metric exists.

In one example, usage features may be mapped based on a pre-defined taxonomy of product names, and text may be searched for product mentions, with analysis and searching for nearby words to indicate a like, dislike, or intent to purchase these products, etc. In another example, the usage features may be described as numbers indicating product mentions, both in general and also in terms of relationships, such as a like, a dislike, ownership, intent to purchase, etc. In one embodiment, the language features may be used for prediction modeling to compute a probability of customer response to direct marketing techniques. In one embodiment, language usage may be mapped to emotional state using known techniques to infer content provider's transient emotional state from language use.

In one embodiment, the time and/or date activity pattern module 140 extracts time and date information regarding when the media activities were conducted, and derives activity patterns based on statistics for the extracted time and date information. The temporal aspects of posting activity are used to infer the times of day and day of week that a person is most likely to be using media activity sources 1-N 170.

In one example, scores may be associated with particular users based on learned language usage and determined traits, such as personality and emotional state. In one example, personality, emotional state, product-relationship, and temporal features derived through analysis are stored in the repository 160 for supplementing existing customer and potential customer demographic information for segmentation of customers and/or potential customers for use in direct marketing. In one embodiment, language usage may be analyzed for determining potential customers based on analysis of communications between current customers and their friends, family members, business associates, etc. In one example, communications may include conversations or comments related to intent to purchase products, likes/dislikes of products, etc. This information may be used to determine other individuals to target marketing information to either through present customers (e.g., for relaying the marketing information), or directly via obtaining user information (e.g., user name of a media platform).

In one embodiment, the time and/or date activity pattern module 140 derives temporal features for timing of offers to particular customers or potential customers of products or services to improve potential response rate for direct marketing. In one example, marketing schemes may include making offers via e-mail, social networks or telephone marketing. Contacting people when they are most likely to be using the particular medium based on personal schedules or habits may increase the likelihood of a positive response to direct marketing information. In one example, if a derived media usage pattern is determined, probabilities or scores may be computed for days of the week and times of day that a user will likely be using media, such as using a computer/cell phone/tablet/etc. to check email, using a social media platform(s), checking messages/chats/tweets/etc. The determined probabilities may then be used for marketing criteria, for example, criteria for sending an offer over the next 3 days, contacting each person at the next time period where the person is >40% likely to be active on a particular social media platform. Temporal patterns of customers and/or potential customers may assist in reducing marketing costs since marketing schemes can be targeted to certain days and times based on temporal patterns (as compared to marketing schemes that targeted all individuals simultaneously at a certain time or date).

In one example, the time and/or date activity pattern module 140 uses a model that is trained from deriving patterns of users in previous media activities (e.g., written/text and/or speech). In one example, information regarding the time interval during the day and the particular day of the week is used. For each time interval and day of the week, a user may have a specific media activity usage behavior that is used for training/learning via a statistical model. In one example, once the model learns usage patterns, the time and/or date activity pattern module 140 predicts a probability or score for each customer or potential customer at a given time on a given day of the week. Based on the learned information, the probability of receipt and viewing of direct marketing information by a customer or potential customer is increased, along with potential for increasing the response rate to the marketing information.

In one embodiment, the time and/or date activity pattern module 140 uses heuristics for predicting whether the customer or potential customer will be likely to perform media activities. In one example, users that recently used particular domain-specific words in their content for status messages (e.g., a connectivity problem, a cell phone battery problem, etc.), or users that have recently sent status updates within their respective social network (e.g., messages that may indicate that the users are currently busy or not ready to receive direct marketing information), are identified as not available for receiving marketing information. In one example, the time and/or date activity pattern module 140 may use a user's past time usage to determine to the extent the person may be interrupted from other tasks, availability means, such as device readiness and connectivity. In one example, time and/or date activity pattern module 140 filters out customers or potential customers that are not ready to receive marketing information and stores the customers and potential customers that are deemed ready to receive marketing information in the repository 160.

In one embodiment, the segmentation module 150 enhances marketing activities that involve manual segmentation based on demographics by the addition of further filtering criteria. Marketers target people that they think believe will respond to marketing information, programs, commercials, coupons, incentives, etc. For example, a product and marketing scheme may relate to demographics of 18-24 year olds in large metropolitan cities. Embodiments of the invention provide for enhanced segmentation using the segmentation module 150 by further segmenting demographic segmentation by using personality, emotional state, and product relationship features for finer segmentation. In one example, the segmentation module 150 provides for enhanced segmentation by targeting high-openness and high-extraversion individuals that mention targeted products positively in language usage samples, but do not own the targeted product. In one example, a sample of language usage may be determined to include language relating users being stressed and unhappy and that may have also mentioned chocolate in a media activity. This information may be used for providing segmentation in order to direct marketing of chocolate ice cream coupons for direct marketing. In another example, online search advertisers may pay to have advertising shown next to certain search terms. The use of personality and emotional traits and language features would allow online search advertisers to ask for personality types and emotional states in addition to search terms for online advertising.

In one embodiment, the mapping of personality traits and emotional state, derived language features and temporal activity patterns, when used with known demographics may be used for segmenting customer and potential customer populations for test marketing campaigns. The result of the test campaign may then be used for future direct marketing and future segmentation based on results and determined correlations between the demographics and personality traits and emotional state, derived language features and temporal activity patterns.

Figure 2:
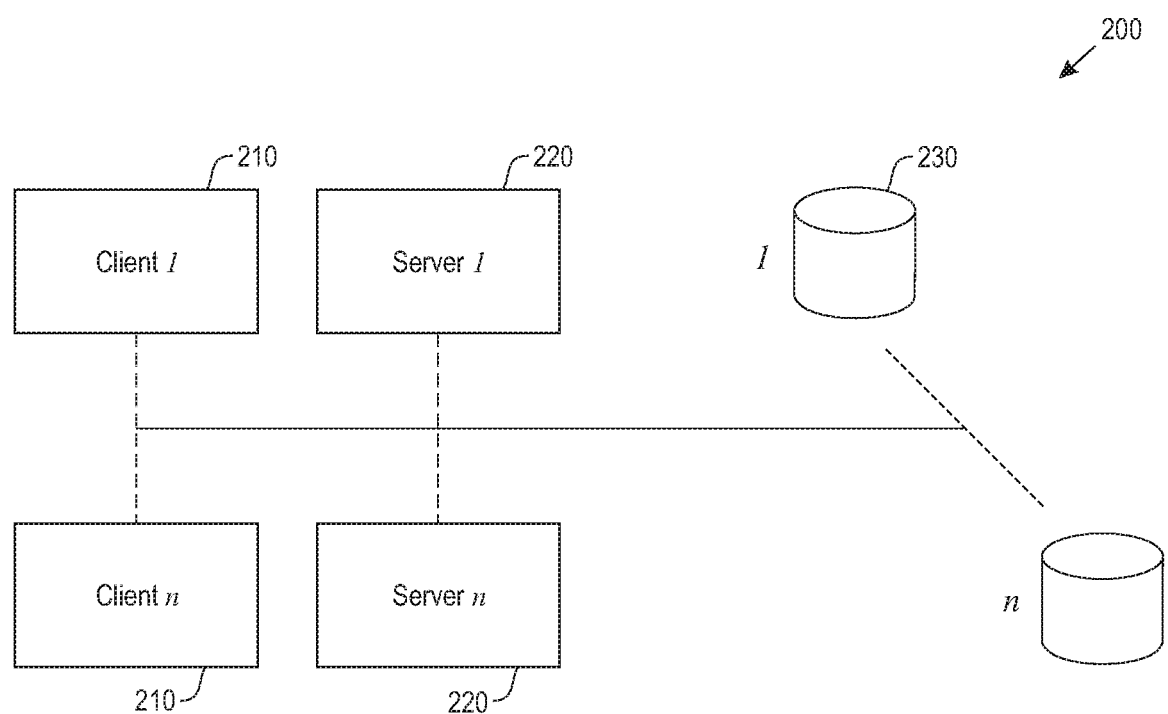
FIG. 2 illustrates a block diagram of an example client/server system utilizing media information for improving direct marketing response rate, in accordance with an embodiment of the invention.

FIG. 2 illustrates a block diagram for a system 200, such as a network platform that employs system 100 for using media information for improving direct marketing response rate. In one embodiment, the system 200 includes multiple client devices 210 1-n, multiple server devices 220 1-n, and multiple storage devices 230 1-n, where n is a positive number greater than 1. In one example, the system 100 may be used only on client devices 210, only on server devices 220, or on both client devices 210 and server devices 220. In one example, the server devices 220 run the network platform and users use the client devices 210 to access the network.

Figure 3:
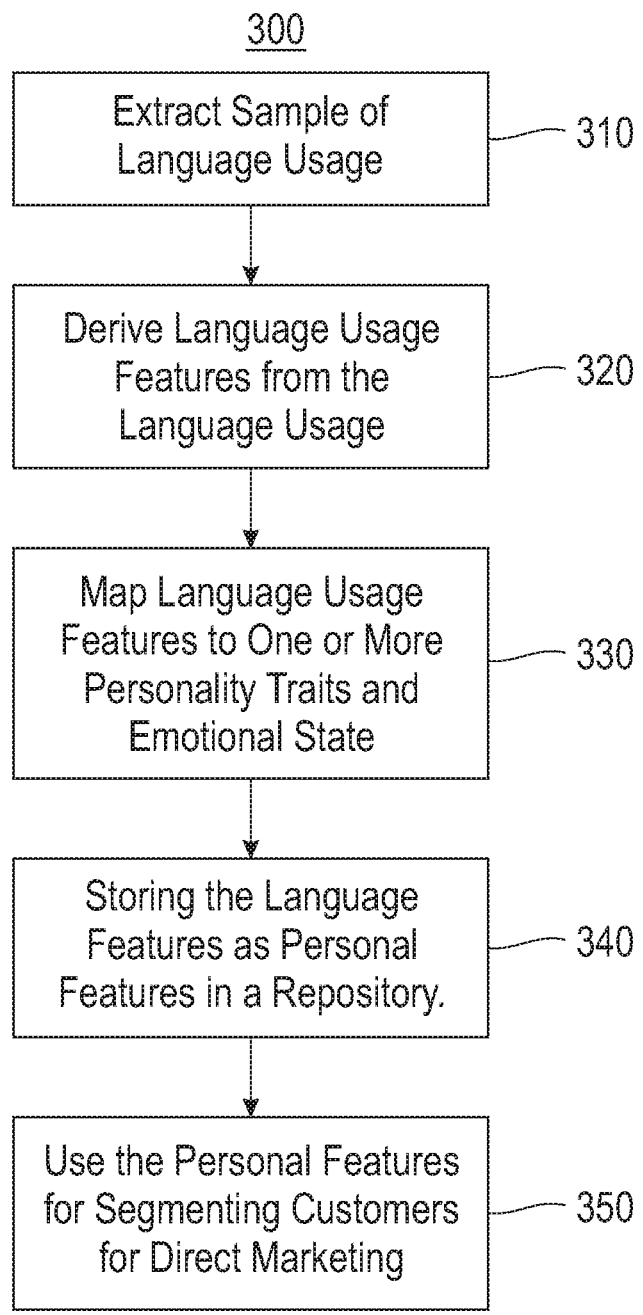
FIG. 3 is a block diagram showing a process for using media information for improving direct marketing response rate, in accordance with an embodiment of the invention.

FIG. 3 illustrates a flowchart of an example process 300 for using media information (e.g., social media information) for improving direct marketing response rate, according to one embodiment. In process block 310, one or more samples of language use are extracted, for example, by the extraction module 110 in FIG. 1. In process block 320, language usage features are derived from the language usage is mapped to one or more of personality traits and emotional states, for example, from the extracted language usage, for example, by the derivation module 130 of system 100. In process block 330, language usage features are mapped to one or more of personality traits and emotional states, for example, by the mapping module 120 of system 100. In process block 340, the mapped language features are stored as personal features in a repository, such as repository 160 of system 100. In process block 350 the personal features are used for segmentation of customers (and/or potential customers) for direct marketing techniques, for example, by the segmentation module 150 of system 100.

In one embodiment, process 300 may further include determining time and date activity patterns of media activities performed by customers and/or potential customers for use in further segmentation of customers or potential customers for use in direct marketing, for example, by the time and/or date activity pattern module 140.

Figure 4:
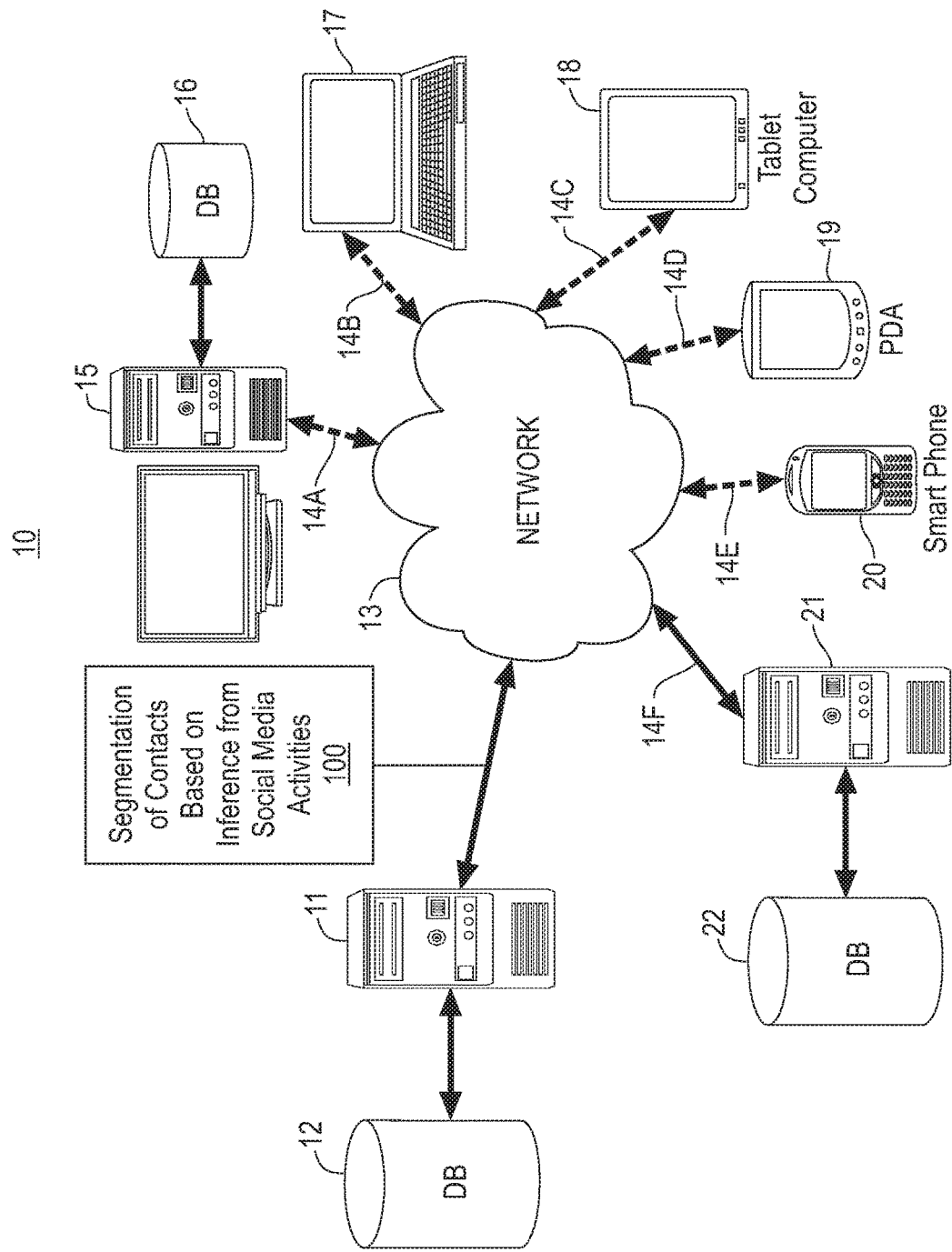
FIG. 4 is a block diagram illustrating an example of a network environment for using media information for improving direct marketing response rate, according to an embodiment of the present invention.

FIG. 4 illustrates an example of the basic components of an information technology system 10 utilizing system 100, according to an embodiment of the present invention. The information technology system 10 includes a server 11 and remote devices 15 and 17-20 that may utilize the system 100 of the present invention. In one embodiment, the server 11 implements the system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote devices 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote devices 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices, and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and databases 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that for certain types of data, the remote devices 15 and 17-20 can access the third party computer systems 21 and database 22 directly using the network 13.

Figure 5:
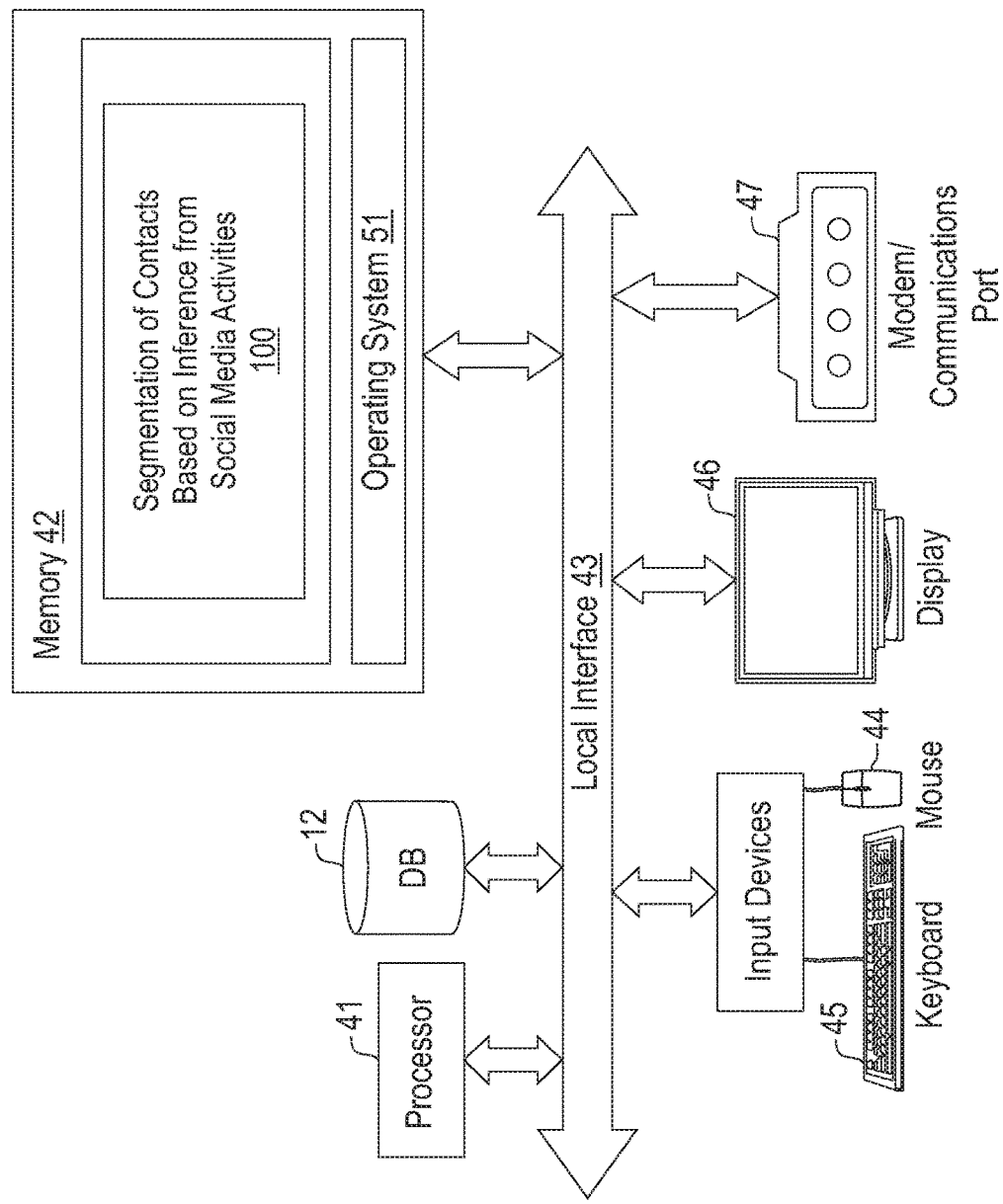
FIG. 5 is a block diagram illustrating an example of a server including a system utilizing media information for improving direct marketing response rate, according to an embodiment of the present invention, as shown in FIG. 4.

The system 100 utilizes a process for using media information for improving direct marketing response rate, according to an embodiment of the invention. Illustrated in FIG. 5 is a block diagram demonstrating an example of server 11, as shown in FIG. 4, utilizing the system 100 according to an embodiment of the present invention. The server 11 includes, but is not limited to, PCs, workstations, laptops, PDAs, palm devices, and the like. The processing components of the third party computer systems are similar to that of the description for the server 11 (FIG. 5).

Generally, in terms of hardware architecture, as shown in FIG. 5, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 5, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, starts the O/S 51, and supports the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

When the system 100 is implemented in software, as is shown in FIG. 5, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to, an Internet browser. The information accessed in server 11 and database 12 can be provided in a number of different forms including, but not limited to, ASCII data, WEB page data (i.e., HTML), XML or other type of formatted data.

As illustrated, the remote device 15 and 17-20 are similar to the description of the components for server 11 described with regard to FIG. 5. The remote devices 15 and 17-20 are referred to as remote devices 15 for the sake of brevity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
    at a server running one or more online social media platforms:
        extracting samples of language usage from one or more social media activities involving users accessing the one or more online social media platforms via client devices;
        determining a likelihood of interest in a product by analyzing the extracted samples for a relationship to the product based on language terms of the extracted samples;
        training a prediction model based on the extracted samples and the determined likelihood of interest in the product;
        predicting a response to marketing of the product using the prediction model;
        identifying one or more of the users who positively mention the product in the extracted samples but do not own the product; and
        increasing a probability of the identified one or more users receiving and viewing direct marketing of the product via the one or more online social media platforms by:
            determining whether the identified one or more users are available to receive and view the direct marketing of the product via the one or more online social media platforms based on device readiness of one or more client devices the identified one or more users use to access the one or more online social media platforms, and device connectivity of the one or more client devices; and
            in response to determining the identified one or more users are available to receive and view the direct marketing of the product via the one or more online social media platforms:
                determining particular days of week and times of day the identified one or more users are most likely to access the one or more online social media platforms via one or more client devices based on the predicted response and time and date information for the extracted samples; and
                timing delivery of one or more electronic offers of the product to the identified one or more users via the one or more online social media platforms in accordance with the determined particular days of week and times of day.

2. The method of claim 1, wherein the extracted samples comprise one or more of a mention of the product, a mention of a competing product of the product, and a mention of an intent to purchase the product.

3. The method of claim 2, wherein the one or more social media activities comprise one or more of a social media writing activity and a speech interaction.

4. The method of claim 3, wherein the relationship to the product comprises one or more of an indication of liking the product, an indication of disliking the product, an indication of ownership of the product, and an indication of an intent to purchase the product.

5. The method of claim 4, wherein determining a likelihood of interest in a product further comprises:
    mapping the language usage to one or more of personality traits and emotional states.

6. The method of claim 5, wherein determining a likelihood of interest in a product further comprises:
    using one or more of Big 5 and linguistic inquiry and word count (LIWC) techniques for the mapping.

7. The method of claim 5, further comprising:
    enhancing online search advertising by associating search terms with one or more of the personality traits and the emotional states.

8. The method of claim 5, further comprising:
    modeling a probability of user response to the direct marketing of the product using test marketing heuristics and the determined likelihood of interest in the product.

9. The method of claim 5, further comprising:
    extracting the time and date information for the extracted samples based on when the one or more social media activities were conducted; and
    deriving temporal activity patterns based on statistics for the time and date information for the extracted samples, wherein the determined particular days of week and times of day is further based on the derived temporal activity patterns.

10. A system comprising a computer processor, a computer-readable hardware storage medium, and program code embodied with the computer-readable hardware storage medium for execution by the computer processor to implement a method comprising:
    at a server running one or more online social media platforms:
        extracting samples of language usage from one or more social media activities involving users accessing the one or more online social media platforms via client devices;
        determining a likelihood of interest in a product by analyzing the extracted samples for a relationship to the product based on language terms of the extracted samples;
        training a prediction model based on the extracted samples and the determined likelihood of interest in the product;
        predicting a response to marketing of the product using the prediction model;
        identifying one or more of the users who positively mention the product in the extracted samples but do not own the product; and
        increasing a probability of the identified one or more users receiving and viewing direct marketing of the product via the one or more online social media platforms by:

determining whether the identified one or more users are available to receive and view the direct marketing of the product via the one or more online social media platforms based on device readiness of one or more client devices the identified one or more users use to access the one or more online social media platforms, and device connectivity of the one or more client devices; and in response to determining the identified one or more users are available to receive and view the direct marketing of the product via the one or more online social media platforms:

determining particular days of week and times of day the identified one or more users are most likely to access the one or more online social media platforms via one or more client devices based on the predicted response and time and date information for the extracted samples; and timing delivery of one or more electronic offers of the product to the identified one or more users via the one or more online social media platforms in accordance with the determined particular days of week and times of day.

11. The system of claim 10, wherein the extracted samples comprise one or more of a mention of the product, a mention of a competing product of the product, and a mention of an intent to purchase the product.

12. The system of claim 11, wherein the one or more social media activities comprise one or more of a social media writing activity and a speech interaction.

13. The system of claim 12, wherein the relationship to the product comprises one or more of an indication of liking the product, an indication of disliking the product, an indication of ownership of the product, and an indication of an intent to purchase the product.

14. The system of claim 13, wherein determining a likelihood of interest in a product further comprises:

mapping the language usage to one or more of personality traits and emotional states.

15. The system of claim 14, wherein determining a likelihood of interest in a product further comprises:

using one or more of Big 5 and linguistic inquiry and word count (LIWC) techniques for the mapping.

16. The system of claim 14, wherein the method further comprises:

enhancing online search advertising by associating search terms with one or more of the personality traits and the emotional states.

17. The system of claim 14, wherein the method further comprises:

modeling a probability of user response to the direct marketing of the product using test marketing heuristics and the determined likelihood of interest in the product.

18. The system of claim 14, wherein the method further comprises:

extracting the time and date information for the extracted samples based on when the one or more social media activities were conducted; and deriving temporal activity patterns based on statistics for the time and date information for the extracted samples, wherein the determined particular days of week and times of day is further based on the derived temporal activity patterns.

* * * * *